Figure 1:
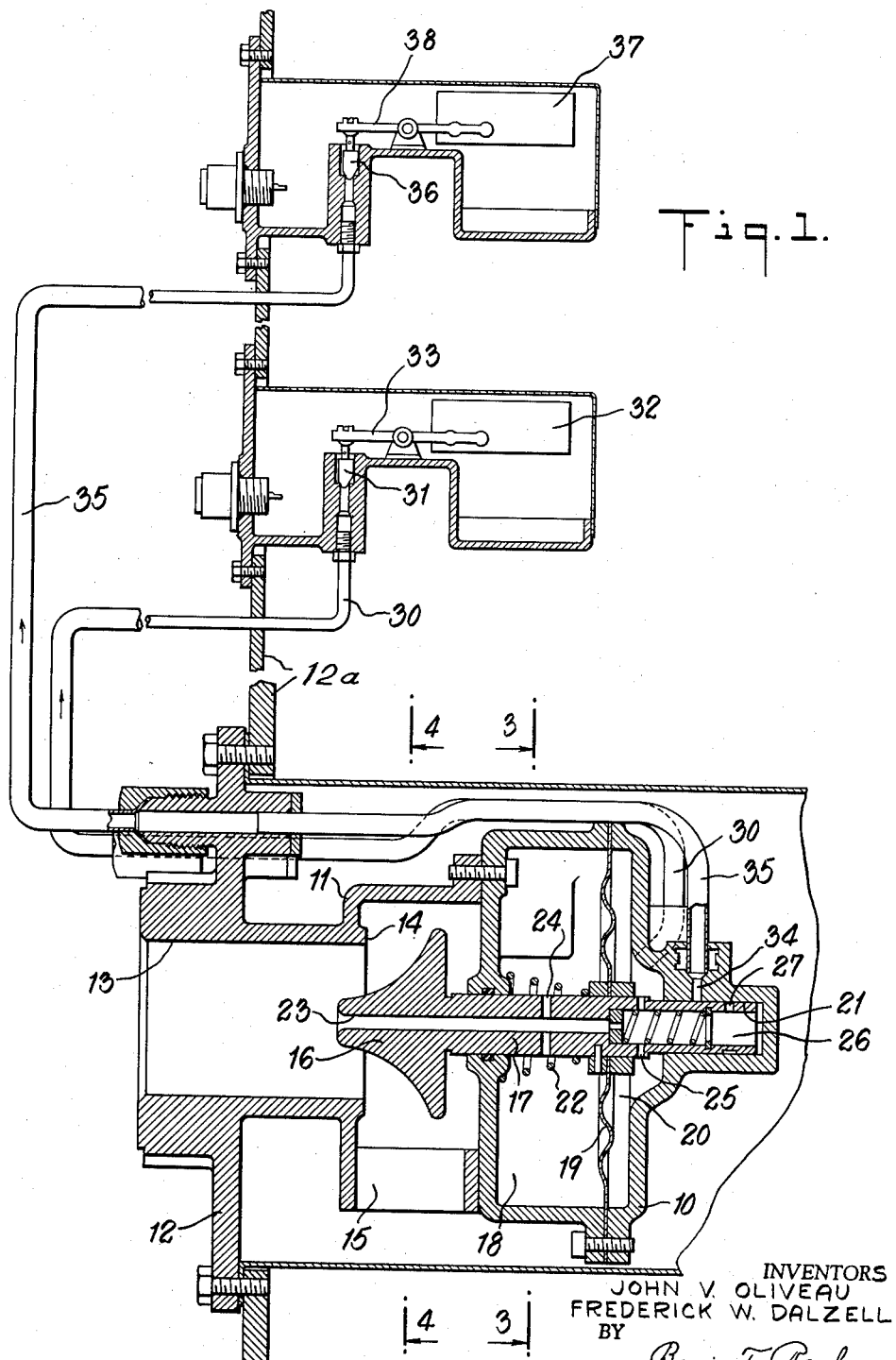

Aug. 26, 1958 J. V. OLIVEAU ET AL 2,849,019
APPARATUS FOR CONTROLLING THE FILLING
AND EMPTYING OF TANKS
Filed Sept. 21, 1956 2 Sheets-Sheet 1

INVENTORS
JOHN V. OLIVEAU
FREDERICK W. DALZELL
BY
Benj. T. Rauber
ATTORNEY

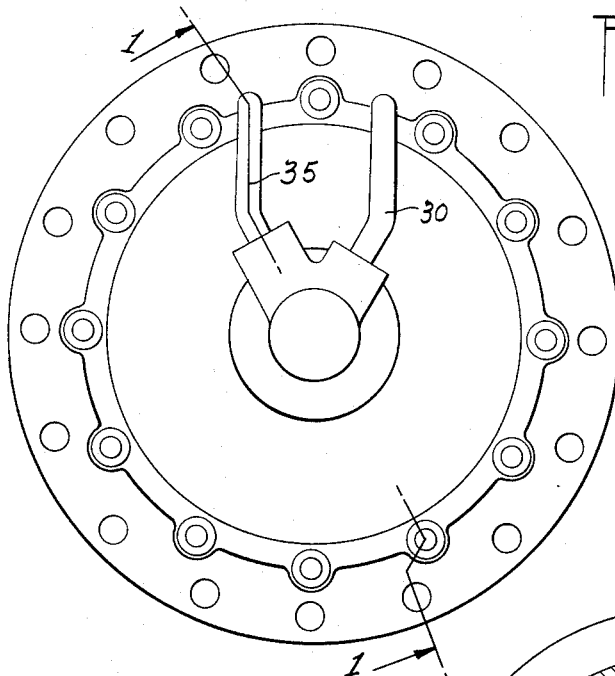
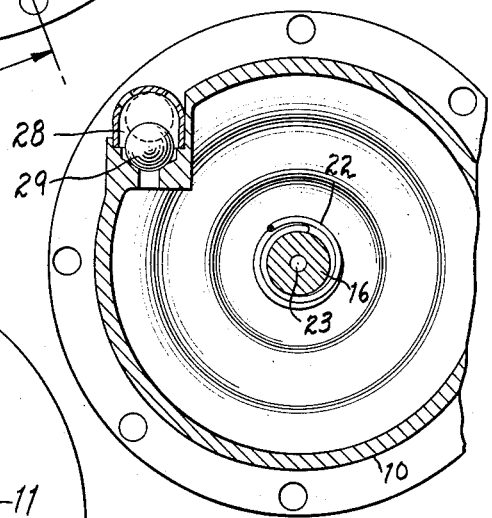
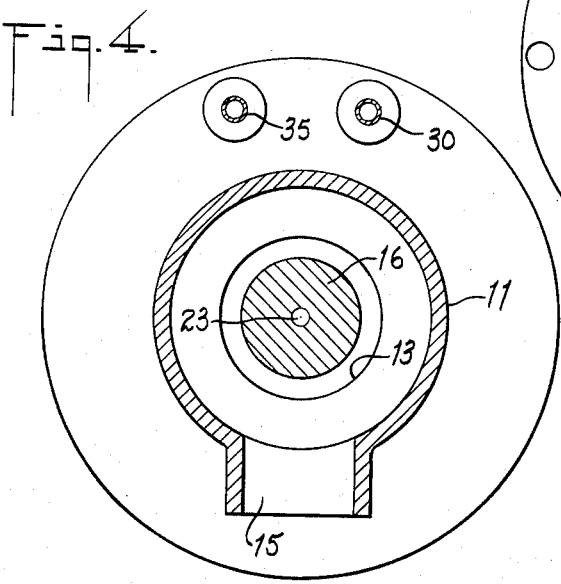

United States Patent Office 2,849,019
Patented Aug. 26, 1958

2,849,019
APPARATUS FOR CONTROLLING THE FILLING AND EMPTYING OF TANKS

John V. Oliveau, Greenwich, Conn., and Frederick W. Dalzell, Yonkers, N. Y., assignors to The Aerotec Corporation, Greenwich, Conn., a corporation of Connecticut Application September 21, 1956, Serial No. 611,144

7 Claims. (Cl. 137—391)

Our invention relates to apparatus for controlling the filling and emptying of tanks such as the fuel tanks of aircraft.

In filling the fuel tank of an airplane or other aircraft it is desirable to fill the tank rapidly until the tank is nearly full and then to fill it more slowly until the level of the fuel reaches the level at which the tank is gauged full. At the end of a flight the tank is emptied and when the fuel is withdrawn to the extent possible, the fuel line or conduit should be closed so that air will not be drawn into it.

Our invention provides apparatus by which the above objects are attained.

In our invention we provide a valve which is preferably placed within the tank near its bottom and connected to the fuel line to receive liquid fuel therefrom or to deliver liquid fuel from the tank thereto. Liquid entering or leaving the tank passes through a valve seat into a passage opening into the tank. A valve element is slidably mounted on a housing to be moved to closing position on the valve seat or, reversely, to open position, by a diaphragm in the housing which is subjected on one side to fluid pressure of the fuel entering the tank through the valve to close the valve when the liquid level in the tank approaches and reaches the full level. In emptying the tank the diaphragm is subjected to a vacuum to close the valve when the liquid in the tank is at the empty level.

For this purpose the valve element is provided with a stem passing slidably and fluid tightly into the housing, through a forward chamber of which the diaphragm forms a partition, and through the diaphragm, to which it is secured fluid tightly, into a rear chamber. A passage is provided through the valve element and stem from its inlet end to the forward and rear chambers so that liquid entering or leaving the valve may flow into or from these chambers. The forward chamber is provided with a float controlled vent which permits liquid to flow from it and permits liquid to enter when the liquid level in the tank is above the level of the float but closes to prevent the entrance of liquid when the liquid level in the tank falls below the level of the float. The rear chamber is connected by a conduit to the lower of two float controlled valves in the upper part of the tank above the valve element and by a second conduit to the higher of the two float controlled valves. The first conduit is always open from the rear chamber to the lower float controlled valve to permit the flow of liquid from the rear chamber until closed by the closing of the float controlled valve. The entrance of liquid from the rear chamber to the second conduit is so controlled by a port in the end portion of the valve stem within the rear chamber as to close the end of this conduit except when the valve element is near closing position. A spring normally holds the valve element in fully opened position.

In operation, when the tank is being filled, fluid entering the valve flows through the passage in the valve element and through the chambers freely so that pressures on opposite sides of the diaphragm are equalized and the valve element is held open by the spring. When the level of liquid in the tank rises sufficiently to close the lower float controlled valve, the liquid passing through the rear valve element into the rear chamber cannot escape from this chamber, and the pressure in this chamber rises to that of the passages in the valve element and overcomes the spring and moves the valve to throttling position. Thereupon a port of the valve passage comes into alignment with the conduit to the higher float controlled valve. The valve element is thus held in this position until the upper float controlled valve is closed by a rise in the liquid level in the tank, whereupon the pressure in the rear chamber rises to move the valve element to closed position. When liquid is withdrawn from the tank the float controlled valves are opened and the valve element is moved to open position. After a flight the residual liquid is withdrawn through the open valve until the float controlled vent of the forward chamber is closed, whereupon a suction created in this chamber draws the diaphragm to close the valve.

An embodiment of our invention is shown by way of illustration in the apparatus shown in the accompanying drawings, in which:

Fig. 1 is a longitudinal section of a valve taken on line 1—1 of Fig. 2 and connections to float controlled valves, Fig. 2 is an end view taken from the right of Fig. 1, Fig. 3 is a section on line 3—3 of Fig. 1, and Fig. 4 is a section on line 4—4 of Fig. 1.

In the embodiment shown in the accompanying drawings the valve elements are mounted in a housing 10 having a forward extension 11 integral with a plate 12 to be secured to a wall 12ª of the tank near the bottom thereof. The extension 11 is provided with an inlet and outlet passage 13 through which liquid may be supplied to and withdrawn from the tank. This passage terminates rearwardly in a valve seat 14 and opens into a downwardly opening passage or shroud 15. Flow of liquid through the passage 13 is controlled by a valve 16 having a rearwardly extending stem 17 slidably and fluid tightly passing through the front wall of the housing 10 into a front chamber 18 formed in the housing by an actuating diaphragm 19. The stem 17 is secured fluid tightly in the diaphragm 19 and passes through it into a rear chamber 20. The rear end portion of the stem is slidable in and guided by a cylindrical recess 21. The valve element 16 is held in its rear, open, position by a coil spring 22 confined between the front wall of the housing and the diaphragm 19.

The valve element 16 and stem 17 are provided with an axial passage 23 extending from the front of the element to the rear end of the stem. Side passages 24 open from the central passage 23 into the chamber 18 and similarly passages 25 open from the central passage to the rear chamber 20. The rear end portion of the passage 23 is enlarged at 26 and has a passage 27 from the enlarged portion 26 to the recess 21. When the valve is open as shown in Fig. 1 liquid may flow from the front end of the valve element 16 through the central passage 23 and passages 24 and 25, respectively, to the chambers 18 and 20, balancing the liquid pressures on opposite sides of the diaphragm.

The chamber 18 is provided with a vent passage 28 controlled by a float valve 29 as shown in Fig. 3 which at all times permits outflow of liquid from the chamber 18 and permits inflow at all times except when the liquid level in the tank falls sufficiently to permit the valve to close. Liquid entering the chamber 20 through the passages 23 and 25 may flow out through a conduit 30 to a lower float valve 31 in the upper part of the tank. When the liquid level rises sufficiently to lift a float 32 connected to the valve 31 by a lever 33, the valve 31 closes shutting off the outflow of liquid.

When the valve 31 closes the pressure of the liquid entering the chamber 20 through the passage 23 overcomes the force of the spring 22 and moves the valve element 16 towards closing position to throttle the flow of liquid through the valve until the opening or port 27 in the stem comes into alignment with a port 34 leading from the recess 21 to a conduit 35 leading to a higher float valve 36 above the float valve 31. The flow of liquid through the conduit continues as long as the valve element 16 remains in throttling position until the liquid level in the tank rises sufficiently to lift a higher float 37 above the float 32 and at the level at which the tank is filled. Thereupon the float 37 closes the valve 36 through a lever 38 shutting off all further flow of liquid from the chamber 20. The pressure in the chamber thereupon rises sufficiently to move the diaphragm 19 and valve element 16 to fully closed position.

After a flight it is desirable to empty the fuel tank of any remaining liquid fuel. As the level of the fuel will be below the level of the floats 32 and 37, the valve 16 will be open and a conduit may be attached to the passage 13 and the fuel may be withdrawn by a pump. However, when the level of the liquid falls sufficiently to permit the vent float valve 29 to close, the suction of the pump is transmitted through the passage 23 and port 24 to the chamber 18 which will thereupon draw the valve element 16 and diaphragm 19 forwardly until the valve closes, thereby preventing the drawing of air from the fuel tank into the fuel line.

With the above apparatus liquid fuel may be supplied to the tank through the refueling passage, the fuel passing the valve element 16 into the passage 15 into the fuel tank and also into and through the passages 23 and 24 to and through the forward chamber 18 and vent 28 to the tank and through the rear chamber 20, conduit 30 and float valve 31 to the tank, respectively. The valve element 16 is held open by the spring 22. When the liquid fuel level in the tank rises sufficiently to lift the float 32 and close the valve, pressure then builds up in the rear chamber 20 sufficiently to move the valve element 16 to throttling position thereby moving the port 27 to communication with the port 34, conduit 35 and float valve 36 thus holding the valve element 16 in throttling position until the liquid level in the tank rises sufficiently to lift the float 37 and close the valve 36. Pressure in the chamber 20 thereupon rises sufficiently to close the valve element against the valve seat 14 and completely shut off the entrance of fuel.

It will be understood that the pressure in the passage 23 is higher than that in the chambers 18 and 20 when the valves 31 and 36 are open so that the liquid may flow freely from them. The side passages 24 and 25 may be restricted to obtain this difference in pressure.

When liquid fuel is to be withdrawn from the tank after a flight, it may be sucked out through the valve until the level falls below the closing level of the float valve 29, which thereupon closes and permits suction to be transmitted through the passages 23 and 24 to the chamber 18 drawing the diaphragm 19 and valve element 16 forwardly to close onto the valve seat 14 and prevent drawing air from the fuel tank into the fuel line.

Having described our invention, we claim:

1. Apparatus for controlling the filling and emptying of tanks which comprises a housing, a valve seat mounted on and in advance of said housing through which liquid may pass into and out of said tank, a diaphragm in said housing dividing said housing into a front chamber and a rear chamber, a valve element movable to seat on said valve seat and having a supporting stem extending into said housing and through said diaphragm into said rear chamber and secured to said diaphragm to be moved thereby, said stem having a passage from the front end of said valve element to said front and rear chambers and a port near its rear end, a pair of float valves outside said housing and above the housing, one at a lower level than the other, a primary conduit extending from said rear chamber to the lower level float valve, a secondary conduit connecting said rear chamber to the higher level float valve and having a port to said rear chamber in sliding abutment with said stem and positioned to align with a port in said stem to be opened by the stem of said valve element when said valve element is near closing position and closed when said valve element is fully open.

2. The apparatus of claim 1 in which said front chamber has an upwardly opening float controlled vent to open when the level of liquid at said housing rises and to close when it falls below the level of said float controlled vent.

3. The apparatus of claim 2 in which said rear chamber has a recess into which said valve stem extends and into which said port opens and in which said valve stem has an opening movable into and out of alignment with said port as said valve element moves into and out of throttling position relative to said valve seat.

4. The apparatus of claim 2 having a spring in said front chamber biasing said diaphragm rearwardly to move said valve element from said valve seat.

5. The apparatus of claim 2 having a downwardly opening passage from said valve seat between said valve seat and said housing.

6. Apparatus for controlling the filling of tanks which comprises a housing, a valve seat mounted on and in advance of said housing through which liquid may pass into and out of said tank, a valve element movable to seat on said valve seat and having a supporting stem extending into said housing, said stem having a passage from the front end of said valve element to said housing, a pair of float valves outside of and above said housing, one at a lower level than the other, a primary conduit extending from said housing to the lower level float valve for the free passage of liquid from said housing to said lower level float valve, a secondary conduit connecting said housing to the higher level float valve and having a port to said rear chamber opened by the stem of said valve element when said valve element is near closing position and closed when said valve element is fully open and means in said housing to move said valve element to throttling position and to open said port when said lower float valve is closed and to move said valve element to fully closed position when said upper float valve is closed.

7. Apparatus for controlling the filling and emptying of tanks which comprises a valve mounting having a valve seat through which liquid may pass into and out of said tank and a housing aligned with the axis of said valve seat, a diaphragm in said housing transverse to the axis of said valve seat and dividing said housing into a forward chamber on the side of the diaphragm nearest the valve seat and a rear chamber on the opposite side of the diaphragm, a valve element movable axially of said valve seat to seat on said valve seat and having a valve stem extending through said forward chamber and said diaphragm and movable by said diaphragm to closed and open positions and having a passage extending longitudinally through said valve and valve stem and opening to said forward chamber and to said rear chamber to admit entering fluid to these chambers, said forward chamber having a vent opening, a float valve to seat on said vent opening when the liquid level falls below said opening, a float valve outside and above said housing, a second float valve outside and above said housing and below the first float valve, a conduit from said rear chamber to said second float valve to provide free passage to said float valve, a second conduit from said rear chamber to the first float valve and having a port opening to the rear chamber, said valve stem closing said port and having an opening positioned to open said port when said valve element is in throttling position to said valve seat.

References Cited in the file of this patent

UNITED STATES PATENTS 2,619,108     Sweeney _____ Nov. 25, 1952
2,750,954     Russell _____ June 19, 1956